United States Patent
Kawahara et al.

(10) Patent No.: US 11,750,317 B2
(45) Date of Patent: Sep. 5, 2023

(54) WAVELENGTH CROSS CONNECT DEVICE AND CROSS CONNECT CONNECTION METHOD

(71) Applicant: Nippon Telegraph and Telephone Corporation, Tokyo (JP)

(72) Inventors: Hiroki Kawahara, Tokyo (JP); Takeshi Seki, Tokyo (JP)

(73) Assignee: Nippon Telegraph and Telephone Corporation, Tokyo (JP)

(*) Notice: Subject to any disclaimer, the term of this patent is extended or adjusted under 35 U.S.C. 154(b) by 91 days.

(21) Appl. No.: 17/437,095

(22) PCT Filed: Mar. 9, 2020

(86) PCT No.: PCT/JP2020/010117
§ 371 (c)(1),
(2) Date: Sep. 8, 2021

(87) PCT Pub. No.: WO2020/189388
PCT Pub. Date: Sep. 24, 2020

(65) Prior Publication Data
US 2022/0182167 A1 Jun. 9, 2022

(30) Foreign Application Priority Data

Mar. 20, 2019 (JP) .................. 2019-052488

(51) Int. Cl.
*H04J 14/02* (2006.01)
*H04Q 11/00* (2006.01)

(52) U.S. Cl.
CPC ...... *H04J 14/0212* (2013.01); *H04Q 11/0003* (2013.01)

(58) Field of Classification Search
CPC .................. H04J 14/0212; H04Q 11/0003
See application file for complete search history.

(56) References Cited

U.S. PATENT DOCUMENTS

2014/0071511 A1* 3/2014 Suzuki ............... G02B 26/0833
359/223.1

FOREIGN PATENT DOCUMENTS

| JP | 2016213559 | 12/2016 |
| JP | 2017157985 | 9/2017 |

* cited by examiner

*Primary Examiner* — Shi K Li
(74) *Attorney, Agent, or Firm* — Fish & Richardson P.C.

(57) ABSTRACT

The present invention is to provide a wavelength cross-connect device that reduces device costs.
A wavelength cross-connect device 10B performs relaying for changing, using WSSs, routes of optical signals transmitted from M routes 1h to Mh, in which K optical fibers 1f to Kf are grouped for each of the routes, on an input side to output the optical signals to respective optical fibers 1f to Kf of M routes 1h to Mh on an output side. Input ports of each of the optical couplers 25a to 26d are connected to output ports of each of first WSSs 21a to 22k. Further, the input ports of each of the optical couplers 25a to 26d are connected to the output ports of the first WSSs 21a to 22k and output ports of each of the optical couplers 25a to 26d are connected to input ports of second WSSs 23a to 24k such that the optical signals input from the optical fibers 1f to Kf in each of the routes 1h to Mh on the input side are capable of being output to the optical fibers 1f to Kf in each of the routes 1h to Mh on the output side, respectively.

8 Claims, 8 Drawing Sheets

WAVELENGTH CROSS CONNECT DEVICE AND CROSS CONNECT CONNECTION METHOD

CROSS-REFERENCE TO RELATED APPLICATIONS

This application is a National Stage application under 35 U.S.C. § 371 of International Application No. PCT/JP2020/010117, having an International Filing Date of Mar. 9, 2020, which claims priority to Japanese Application Serial No. 2019-052488, filed on Mar. 20, 2019. The disclosure of the prior application is considered part of the disclosure of this application, and is incorporated in its entirety into this application.

TECHNICAL FIELD

The present invention relates to a wavelength cross-connect device and a cross-connect connection method used in a ROADM (Reconfigurable Optical Add/Drop Multiplexer) that plays a role of a route switch for optical signals transmitted by various modulation systems such as wavelength division multiplexing in an optical network.

BACKGROUND ART

Conventionally, a wavelength cross-connect device is connected, as a relay node of an optical signal, to an optical fiber of a route (optical transmission line) in which a plurality of optical fibers of an optical network are grouped together. In the wavelength cross-connect device, optical signals from routes on an input side are output to predetermined routes on an output side via a plurality of WSSs (Wavelength Selective Switches).

Figure 7:
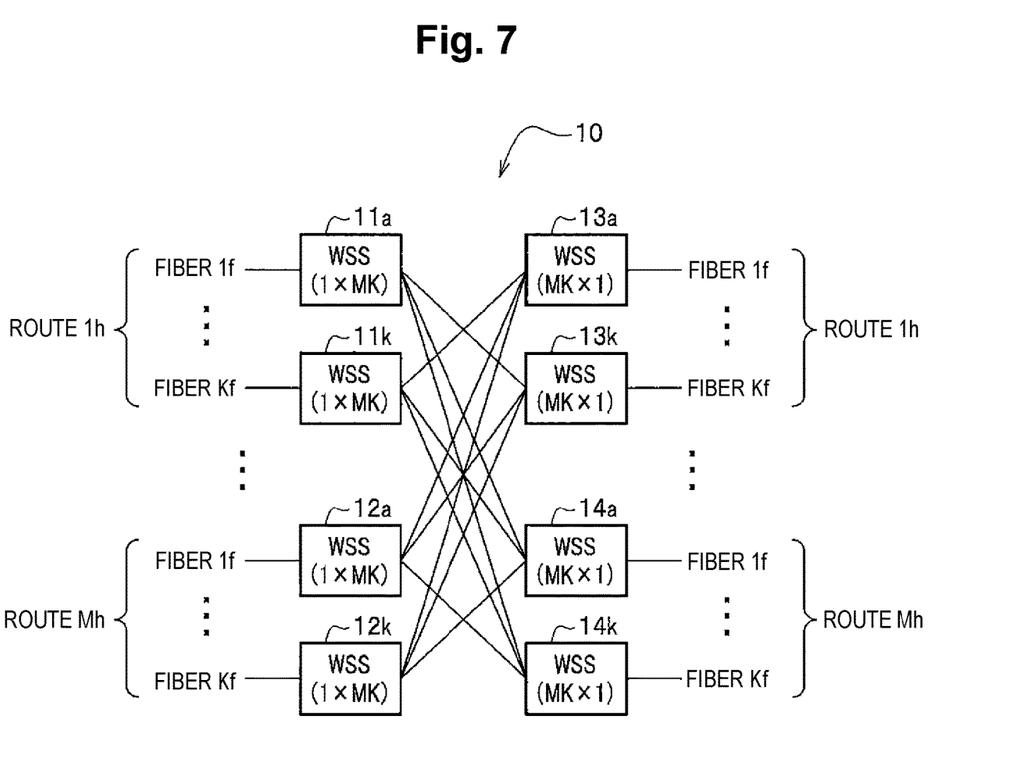
FIG. 7 is a block diagram showing a configuration of a conventional wavelength cross-connect device.

FIG. 7 is a block diagram showing a configuration of a conventional wavelength cross-connect device 10. The wavelength cross-connect device 10 includes, on an input side, WSSs 11a to 11k and 12a to 12k (11a to 12k) respectively connected to a plurality of optical fibers 1f to Kf respectively passing through a plurality of routes 1h to Mh. Further, the wavelength cross-connect device 10 includes, on an output side, WSSs 13a to 13k and 14a to 14k (13a to 14k) having the same number as those on the input side and respectively connected to a plurality of optical fibers 1f to Kf respectively passing through a plurality of routes 1h to Mh on the output side.

The number of plurality of optical fibers 1f to Kf respectively passing through the routes 1h to Mh on the input side is K (K=number of optical fibers). The respective WSSs 11a to 12k have the same configuration, each of the WSSs having M×K outputs with 1 input to which an optical signal for each of the optical fibers 1f to Kf is input (1×MK). However, the symbol M indicates the number of routes. When the number M of routes is 2 (M=2) and the number K of optical fibers is 2 (K=2), the number of WSSs 11a to 11k on the route 1h is 2, and the number of WSSs 12a to 12k on the route Mh is also 2.

The number of output ports of each of the WSSs 11a to 12k is 4 (=M×K=2×2). The number of input ports of the WSSs 13a to 14k on the output side connected to the output ports of the WSSs 11a to 12k on the input side is equal to the number of output ports of the WSSs on the input side. However, in the WSSs 11a to 12k on the input side and the WSSs 13a to 14k on the output side, the WSSs connected to the routes on the input and output sides are not connected to each other.

Therefore, the WSSs 11a to 12k on the input side and the WSSs 13a to 14k on the output side are connected to each other with three input ports and three output ports. For example, the three output ports of the WSS 11a are connected to the input ports of the three WSSs 13k, 14a, and 14k.

In this example, the number M of routes is 2 (M=2), the number K of optical fibers is 2 (K=2), the number K of WSSs on the input side is 2 (K=2), and the number K of WSSs on the output side is 2 (K=2).

In such a wavelength cross-connect device 10, when the number K of fibers per one route increases due to the addition of optical fibers, the number of input and output ports of the wavelength cross-connect device 10 increases by the number M of routes×the number K of fibers. Along with such an increase, the number of WSSs also increases and the number of wirings due to the optical fibers also increases, so that the wavelength cross-connect device 10 increases in terms of costs (also referred to as device costs).

Figure 8:
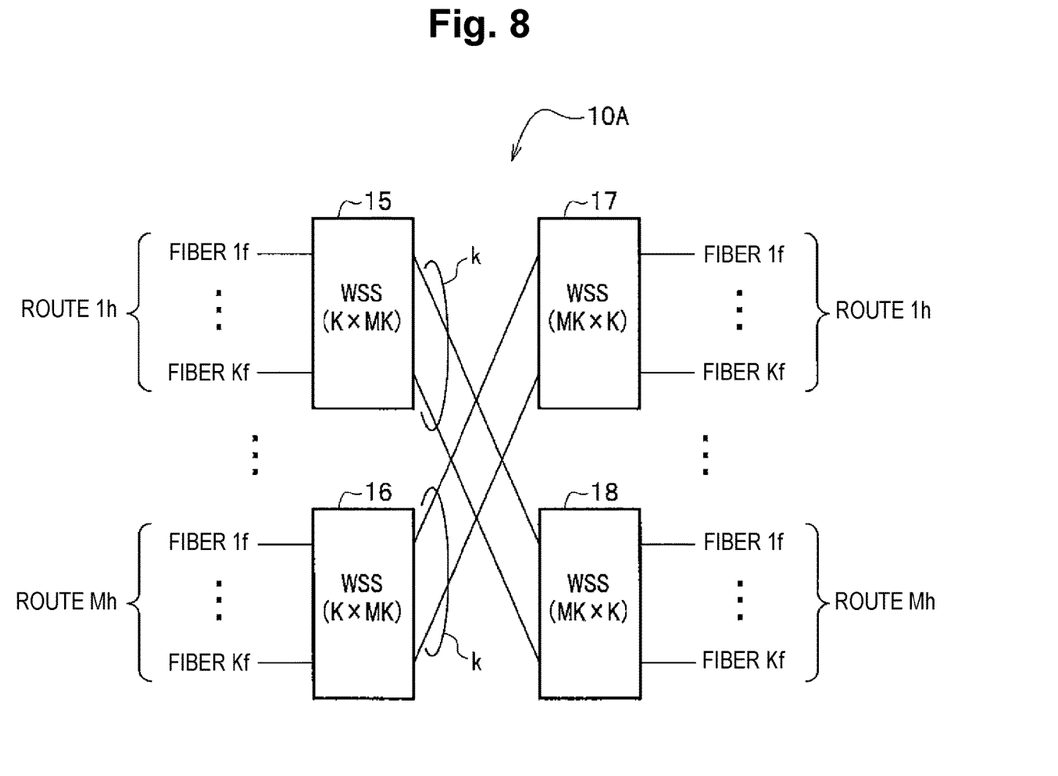
FIG. 8 is a block diagram showing a configuration of a wavelength cross-connect device according to Patent Literature 1.

Therefore, according to a technique disclosed in Patent Literature 1, a configuration of a wavelength cross-connect device is proposed to reduce the number of WSSs and the number of optical fiber wirings. A wavelength cross-connect device 10A having such a configuration shown in FIG. 8 is configured such that one WSS 15 is connected to K optical fibers 1f to Kf of 1 route 1h on an input side. Similarly, one WSS 16 is connected to K optical fibers 1f to Kf of 1 route Mh which is the other route. Also on an output side, one WSS 17 is connected to 1 route 1h, and one WSS 18 is connected to 1 route Mh which is the other route. With such a configuration, the number of WSSs is reduced.

CITATION LIST

Patent Literature

Patent Literature 1: Japanese Patent Laid-Open No. 2016-213559

SUMMARY OF THE INVENTION

Technical Problem

However, according to the wavelength cross-connect device 10A of Patent Literature 1, since each of the WSSs 15 and 16 on the input side has K inputs and MK outputs and each of the WSSs 17 and 18 on the output side has MK inputs and K outputs, the WSSs on the input and output sides are configured with multiple ports. Since the WSSs configured with the multiple ports are expensive, there is a problem that the wavelength cross-connect device 10A becomes expensive as a result.

The present invention has been made in view of such circumstances, and is to provide a wavelength cross-connect device and a cross-connect connection method capable of reducing device costs.

Means for Solving the Problem

As a means for solving the problem, a configuration according to claim 1 provides a wavelength cross-connect device that performs relaying for changing, using WSSs (Wavelength Selective Switches), routes of optical signals transmitted from M routes, in which K optical fibers are grouped for each of the routes, on an input side to output the optical signals to respective optical fibers of M routes on an output side, the wavelength cross-connect device including:

M×K first WSSs each including a 1 input port connected to each of the optical fibers of each of the routes on the input side and M×L output ports, where a positive integer L≤K; M×K second WSSs each including a 1 output port connected to each of the optical fibers of each of the routes on the output side and M×L input ports; and 2×M×L optical couplers each including K input ports connected to output ports of each of the first WSSs and K output ports connected to input ports of each of the second WSSs, wherein the input ports of each of the optical couplers are connected to the output ports of respective first WSSs of the first WSSs, and the input ports of each of the optical couplers are connected to the output ports of the first WSSs and the output ports of each of the optical couplers are connected to the input ports of the second WSSs such that the optical signals input from the optical fibers in each of the routes on the input side are capable of being output to the optical fibers in each of the routes on the output side, respectively.

A configuration according to claim 6 provides a cross-connect connection method of a wavelength cross-connect device that performs relaying for changing, using WSSs, routes of optical signals transmitted from M routes, in which K optical fibers are grouped for each of the routes, on an input side to output the optical signals to respective optical fibers of M routes on an output side, the cross-connect connection method including steps, which are executed by the wavelength cross-connect device, of: detecting the number M of routes on the input side and the number K of optical fibers in each of the routes; detecting the number M of routes on the output side and the number K of optical fibers in each of the routes; detecting, based on the detected number K of optical fibers on the input side, the number of first WSSs each including a 1 input port connected to each of the K optical fibers and M×L output ports, where a positive integer L≤K; detecting, based on the detected number K of optical fibers on the output side, the number of second WSSs each including a 1 output port connected to each of the K optical fibers and M×L input ports; connecting the input port of each of the first WSSs to each of the optical fibers in each of the routes on the input side; connecting the output port of each of the second WSSs to each of the optical fibers in each of the routes on the output side; detecting the number of optical couplers each including K input ports connected to the output ports of the first WSSs on the input side and K output ports connected to the input ports of the second WSSs on the output side; connecting the K input ports of each of the optical couplers to the output ports of each of the first WSSs; and connecting the input ports of each of the optical couplers to M×K output ports of the first WSSs on the input side and connecting the output ports of each of the optical couplers to M×K input ports of the second WSSs on the output side such that the optical signals input from the K optical fibers in each of the routes on the input side are capable of being output to the K optical fibers in each of the routes on the output side, respectively.

According to the configuration of claim 1 and the method of claim 6, the wavelength cross-connect device includes (M×K) first WSSs each having 1 input port connected to each of the optical fibers in each of the routes on the input side and M×L (herein, a positive integer L≤K) output ports (1×ML), and (M×K) second WSSs each having 1 output port and M×L input ports on the output side (ML×1). Further, the wavelength cross-connect device includes (2×M×L) optical couplers having the K input ports and the K output ports (K×K) respectively connected to the output ports of each of the first WSSs and the input ports of each of the second WSSs.

The first WSSs with the 1×ML ports and the second WSSs with the ML×1 ports are cheap in terms of unit price, and thus are cheap as a whole compared with the case of using the conventional expensive WSS with multiple ports of both input and output ports. In addition, since the unit price of the optical couplers with K×K ports are also significantly cheaper than that of the WSSs, a plurality of optical couplers are used with a low unit price. Therefore, even when a plurality of first WSSs with 1×ML ports, a plurality of second WSSs with ML×1 ports, and a plurality of optical couplers with K×K ports are used, the device costs can be reduced compared with the conventional device.

A configuration according to claim 2 is the wavelength cross-connect device according to claim 1 in which when the optical signal input from the optical fiber of the route is an optical signal subjected to wavelength division multiplexing with a wavelength division multiplexing number T, each of the first WSSs includes a demultiplexer configured to demultiplex and output an optical signal obtained by wavelength division multiplexing of the optical signal, which is input from the optical fiber of the route, with a wavelength division multiplexing number T, T switches configured to selectively output demultiplexed optical signals having respective wavelengths and including a 1 input port and ML output ports, and T multiplexers configured to multiplex and output the optical signals output from the respective switches and ML input ports and a 1 output port.

According to such a configuration, the following operational effects can be obtained. The optical signal input from the optical fiber in each of the routes on the input side is an optical signal subjected to wavelength division multiplexing. In this case, the DEMUX demultiplexes the optical signal input from the optical fiber, and the respective switches selectively output the demultiplexed optical signals having individual wavelengths to the output destination paths (output ports), thereby the optical signals having specific wavelengths can be output to the optical couplers from a predetermined output ports.

A configuration according to claim 3 is the wavelength cross-connect device according to claim 1 in which each of the second WSSs includes 2×M×L demultiplexers configured to demultiplex and output optical signals output from each of the optical couplers, switches including ML input ports, to which the optical signals demultiplexed by each of the demultiplexers are input, and a 1 output port, and a multiplexer configured to multiplex the optical signals output from the switches and output the multiplexed optical signal to the optical fiber on the output side from a 1 output port.

According to such a configuration, the following operational effects can be obtained. The optical signals input from the optical couplers are demultiplexed, and the respective switches selectively output the demultiplexed optical signals to the multiplexer, thereby the optical signal can be output from the 1 output port to the optical fiber on the output side.

A configuration according to claim 4 is the wavelength cross-connect device according to claim 1 in which when the optical signal input from the optical fiber of the route is an optical signal subjected to wavelength division multiplexing, each of the first WSS includes an input collimator to which the optical signal is input from the optical fiber, a grating that diffracts and reflects the optical signal incident from the input collimator at different angles depending on a wavelength to perform demultiplexing on the optical signal, an optical switching element that is incident with the demultiplexed optical signals and reflects the optical signals by changing reflection angles for each wavelength of the demultiplexed optical signals such that the demultiplexed optical signals go toward the output ports of each of the first WSSs connected to the input ports of the optical coupler, and output collimators that are incident with the reflected optical signals via the grating and are connected to the input ports of the optical coupler.

According to such a configuration, the first WSS can be configured by at least a combination of optical system components using a plurality of collimators, gratings, and optical switching elements, and a plurality of first WSS can be configured by a combination of the optical system components. For this reason, since the plurality of WSSs can be integrated, the wavelength cross-connect device can be reduced in size.

A configuration according to claim 5 is the wavelength cross-connect device according to claim 1 in which each of the second WSSs includes input collimators to which the optical signals output from each of the optical couplers are input, a grating that diffracts and reflects the optical signals incident from the input collimators at different angles depending on a wavelength to perform demultiplexing on the optical signals, an optical switching element that is incident with the demultiplexed optical signals and reflects the optical signals by changing reflection angles for each wavelength of the demultiplexed optical signals such that the demultiplexed optical signals go toward the output ports of each of the second WSSs connected to the optical fiber of the route, and an output collimator that is incident with the reflected optical signals via the grating and are connected to the optical fiber of the route.

According to such a configuration, the plurality of second WSSs connected to the output ports of the optical couplers can be configured by a combination of optical system components using a plurality of collimators, gratings, and optical switching elements, and the plurality of second WSS can be configured by a combination of the optical system components. For this reason, since the plurality of second WSSs can be integrated, the wavelength cross-connect device can be reduced in size.

Effects of the Invention

According to the present invention, it is possible to provide a wavelength cross-connect device and a cross-connect connection method that reduce device costs.

DESCRIPTION OF EMBODIMENT

An embodiment of the present invention will be described below with reference to the drawings. However, components having a corresponding function are denoted by the same reference numerals in all the drawings of the description, and the description thereof will be omitted as appropriate.

Configuration of Embodiment

Figure 1:
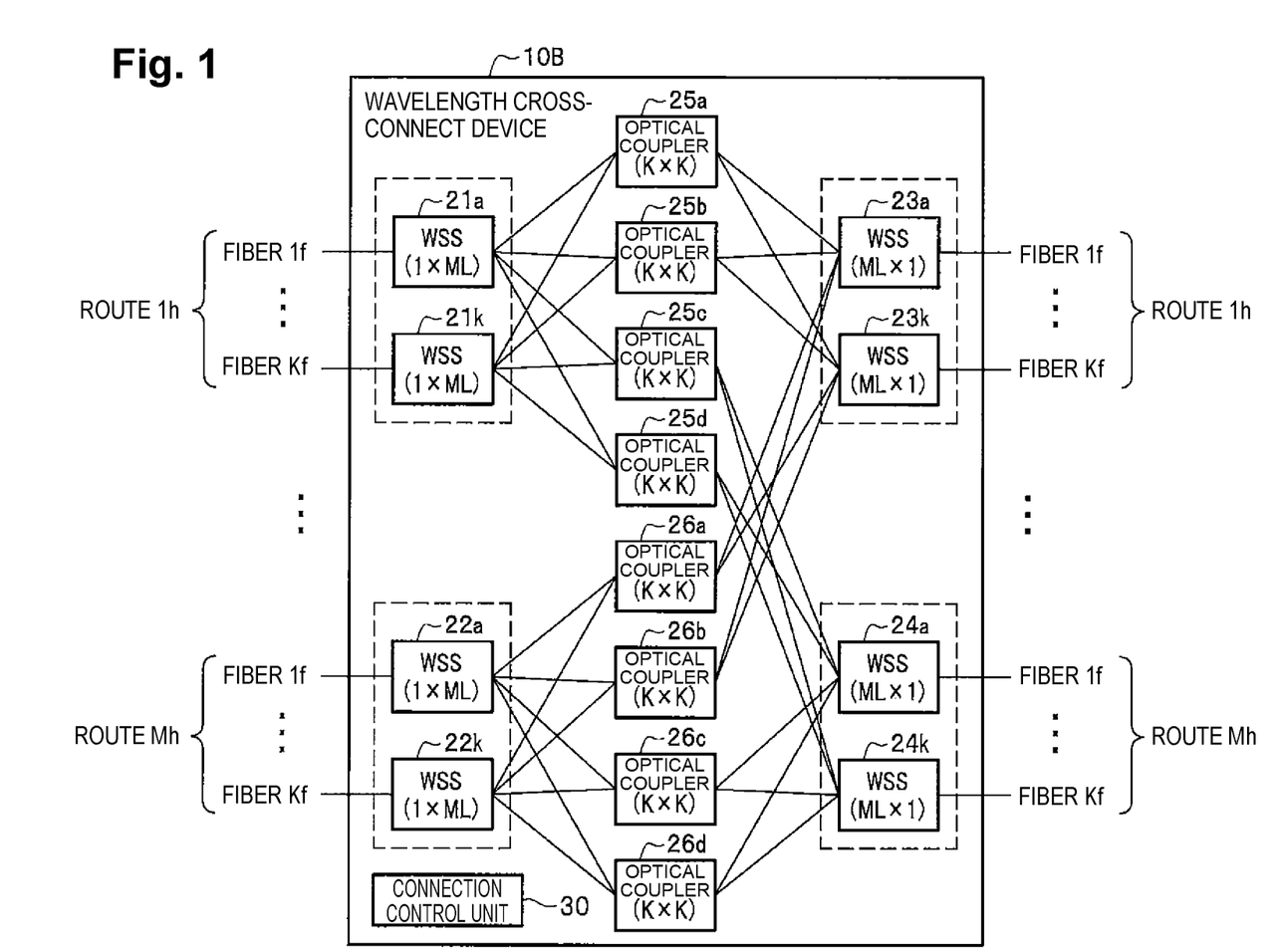
FIG. 1 is a block diagram showing a configuration of a wavelength cross-connect device according to an embodiment of the present invention.

FIG. 1 is a block diagram showing a configuration of a wavelength cross-connect device according to an embodiment of the present invention.

A wavelength cross-connect device 10B shown in FIG. 1 includes, on an input side, WSSs 21a to 21k and 22a to 22k (21a to 22k) respectively connected to a plurality of optical fibers 1f to Kf passing through a plurality of routes 1h to Mh. In addition, the wavelength cross-connect device 10B includes, on an output side, WSSs 23a to 23k and 24a to 24k (23a to 24k) having the same number as that of the WSSs on the input side and respectively connected to a plurality of optical fibers 1f to Kf for each of routes 1h to Mh on the output side. Further, the wavelength cross-connect device 10B includes a plurality of optical couplers 25a, 25b, 25c, 25d, 26a, 26b, 26c, 26d (25a to 26d) connected between the WSSs 21a to 22k on the input side and the WSSs 23a to 24k on the output side. Further, the wavelength cross-connect device 10B includes a connection control unit 30. The WSSs 21a to 21k and 22a to 22k constitute a first WSS described in claims. The WSSs 23a to 23k and 24a to 24k constitute a second WSS described in claims.

The number of the plurality of optical fibers 1f to Kf for each of the routes 1h to Mh on the input side is K (K=number of optical fibers). Each of the WSSs 21a to 21k and 22a to 22k has the same configuration, and is WSS of one input, in which an optical signal is input from each of the optical fibers 1f to Kf, and M×L outputs (1×ML). However, M indicates the number of routes, ML indicates the number of output ports of the WSS, and a relation of M≥L (L is an arbitrary positive integer) is satisfied.

Each of the optical couplers 25a to 26d has K inputs and K outputs (K×K), and 2×ML optical couplers are provided.

In the wavelength cross-connect device 10B having such a configuration, for example, when the number of routes is 2 (M=2), the number of optical fibers is 2 (K=2), and L=2, the number of WSSs 21a to 21k on the route 1h side is 2. The number of output ports ML for each of the WSSs 21a to 21k is 4 (=M×L=2×2). The number of input ports for each of the WSSs 23a to 23k on the output side connected to the output ports for each of the WSSs 21a to 21k on the input side via the optical couplers 25a to 26d is 4, which is the same as the number of output ports on the input side.

Similarly, on the other route Mh side, the number of WSSs 22a to 22k on the route Mh side is 2. The number of output ports ML for each of the WSSs 22a to 22k is 4 (=M×L). The number of input ports for each of the WSSs 24a to 24k on the output side connected to the output ports for each of the WSSs 22a to 22k on the input side is 4, which is the same as the number of output ports on the input side.

The total number of optical couplers 25a to 26d with K×K ports is 8 (=2×ML=2×2×2). Since K=2, each of the optical couplers 25a to 26d includes 2 input ports and 2 output ports. In the 2 input ports of each of the optical couplers 25a to 26d, for example, the 2 input ports of the optical coupler 25a are connected to 1 output port of the WSS 21a on the input side and 1 output port of the WSS 21k on the input side, respectively. The same applies to the other optical couplers 25b to 26d.

On the other hand, the 2 output ports of each of the optical couplers 25a to 26d are connected in a crosswise manner (cross-connect connection) to each of the WSSs 23a to 24k on the output side. Such a cross-connect connection is a connection by which optical signals input from the optical fibers in each of the routes 1h to Mh on the input side can be uniformly (respectively) output to the optical fibers 1f to Kf in each of the routes 1h to Mh on the output side.

In the cross-connect connection, for example, on the route 1h on the output side, the 2 output ports of the optical coupler 25a are connected to the input ports of the WSSs 23a and 23k on the output side, and the 2 output ports of the optical coupler 25b are connected to the input ports of the WSSs 23a and 23k on the output side. Further, the 2 output ports of the optical coupler 25c are connected to the input ports of the WSSs 24a and 24k on the output side, and the 2 output ports of the optical coupler 25d are connected to the input ports of the WSSs 24a and 24k on the output side. The other route Mh on the output side is connected in the same manner.

By such a connection, the optical signals input from the optical fibers 1f to Kf of the routes 1h to Mh on the input side can be route-switched to the optical fibers 1f to Kf of all the routes 1h to Mh on the output side.

The connection control unit 30 detects the number M of routes 1h to Mh and the number K of optical fibers of the optical fibers 1f to Kf on the input side and the number M of routes 1h to Mh and the number K of optical fibers of the optical fibers 1f to Kf on the output side (for example, K=2). In addition, the connection control unit 30 detects the number of WSSs 21a to 21k and 22a to 22k with 1×ML ports and the number of WSSs 23a to 23k and 24a to 24k with ML×1 ports. Further, the connection control unit 30 detects 2×ML which is the number of optical couplers 25a to 26d with K×K ports.

Further, the connection control unit 30 uses a robot (not shown) for connection to connect the WSSs 21a to 21k and 22a to 22k of 1×ML, which is the detected number of WSSs on the input side, to the optical fibers if to Kf of the routes 1h to Mh on the input side. Further, the connection control unit 30 connects the WSSs 23a to 23k and 24a to 24k of ML×1, which is the number of WSSs on the output side, to the optical fibers 1f to Kf of the routes 1h to Mh on the output side.

Further, the connection control unit 30 connects the 2 input ports for each of the optical couplers 25a to 26d to the output ports of the predetermined WSSs 21a to 21k and 22a to 22k on the input side. The connection control unit 30 connects the 2 output ports of the respective optical couplers 25a to 26d to the respective optical couplers 23a to 24k on the output side in a following cross-connect connection manner.

Operation of Cross-Connect Connection

The connection control unit 30 performs the cross-connect connection of the wavelength cross-connect device 10B shown in FIG. 1 as follows. An operation of such a cross-connect connection will be described with reference to a flowchart shown in FIG. 2.

Figure 2:
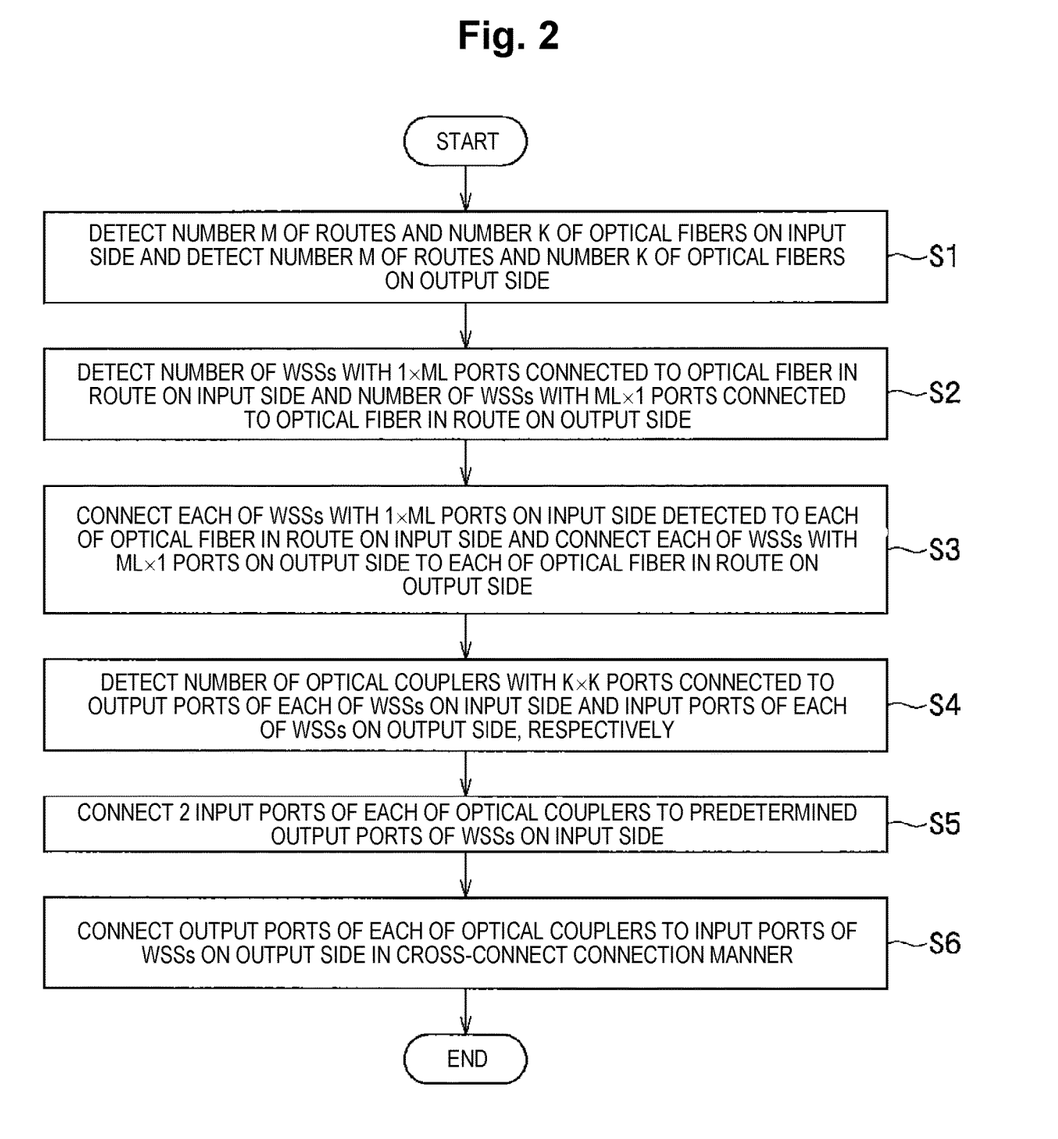
FIG. 2 is a flowchart illustrating an operation of a cross-connect connection of the wavelength cross-connect device of the embodiment.

In step S1 shown in FIG. 2, the connection control unit 30 detects the number M (for example, M=2) of routes 1h to Mh on the input side and the number K (for example, K=2) of optical fibers of the optical fibers 1f to Kf of the routes 1h to Mh. Further, the connection control unit 30 detects the number M (for example, M=2) of routes 1h to Mh on the output side and the number K (for example, K=2) of optical fibers of the optical fibers 1f to Kf of the routes 1h to Mh.

In step S2, the connection control unit 30 detects, based on the detected number of optical fibers K=2, the number of WSSs of the 1×ML WSSs 21a to 21k and 22a to 22k connected to the optical fibers 1f to Kf of the routes 1h to Mh on the input side. Since the number of WSSs is the same as the number of optical fibers K=2, the number of WSSs is 2 for one route, and is 4 (=M×K=2×2) for all of the routes 1h to Mh. Further, the connection control unit 30 detects the number of WSSs of the ML×1 WSSs 23a to 23k and 24a to 24k connected to the optical fibers 1f to Kf of the routes 1h to Mh on the output side. The number of WSSs is also 2 for one route and is 4 for all of the routes 1h to Mh.

In step S3, the connection control unit 30 performs the following two operations using a robot (not shown) for connection. In a first operation, the WSSs 21a to 21k and 22a to 22k with 1×ML ports, which are WSSs on the input side detected in step S2, are connected to the optical fibers 1f to Kf of the routes 1h to Mh on the input side. In a second operation, the WSSs 23a to 23k and 24a to 24k with ML×1 ports, which are WSSs on the output side are connected to the optical fibers 1f to Kf of the routes 1h to Mh on the output side. Such a connection may be manually performed in such a manner that a person recognizes the result of the number of WSSs, which is detected by the connection control unit 30, via a monitor.

In step S4, the connection control unit 30 detects the number (2×ML=2×2×2=8) of optical couplers 25a to 26d with K×K ports (for example, K=2) respectively connected to the output ports of each of the WSSs 21a to 22k on the input side and the input ports of each of the WSSs 23a to 24k on the output side.

In step S5, the connection control unit 30 connects the 2 input ports for each of the respective optical couplers 25a to 26d to the predetermined output ports of the WSSs 21a to 21k and 22a to 22k on the input side. For example, in the case of the optical coupler 25a, the 2 input ports are connected to the 1 output port of the WSS 21a and the 1 output port of the WSS 21k on the input side. Other optical couplers 25b to 26d are also connected in the same manner.

In step S6, the connection control unit 30 connects the 2 output ports of the respective optical couplers 25a to 26d to the respective WSSs 23a to 24k on the output side in a cross-connect connection manner. In other words, the connection control unit 30 connects the 2 output ports of the optical coupler 25a to the input ports of the WSSs 23a and 23k in the route 1h on the output side, and connects the 2 output ports of the optical coupler 25b to the input ports of the WSSs 23a and 23k.

Further, the connection control unit 30 connects the 2 output ports of the optical coupler 25c to the input ports of the WSSs 24a and 24k, and connects the 2 output ports of the optical coupler 25d to the input ports of the WSSs 24a and 24k. The connection control unit 30 also connects the other route Mh on the input side in the same manner. Such a connection may be manually performed in such a manner that a person recognizes the result of the number of optical couplers, which is detected by the connection control unit 30, via a monitor.

By such a cross-connect connection, the optical signals input from the optical fibers in each of the routes 1h to Mh on the input side can be uniformly output to the optical fibers 1f to Kf in each of the routes 1h to Mh on the output side. Thus, the input optical signals can be route-switched to the optical fibers 1f to Kf of all of the routes 1h to Mh.

Effects of Embodiment

The wavelength cross-connect device 10B according to the embodiment performs relaying for changing the routes of the optical signals transmitted from the K optical fibers 1f to Kf in the respective M routes 1h to Mh on the input side using the WSSs to output the optical signals to the respective optical fibers 1f to Kf in each of the M routes 1h to Mh on the output side. The wavelength cross-connect device 10B has the following characteristic configuration.

The wavelength cross-connect device 10B includes (M×K) first WSSs 21a to 22k each having 1 input port connected to each of the optical fibers 1f to Kf in each of the routes 1h to Mh on the input side and M×L (herein, a positive integer L≤K) output ports. In addition, the wavelength cross-connect device 10B includes (M×K) second WSSs 23a to 24k each having 1 output port connected to each of the optical fibers 1f to Kf in each of the routes 1h to Mh on the output side and M×L input ports. Further, the wavelength cross-connect device 10B includes (2×M×L) optical couplers 25a to 26d each having K input ports and K output ports respectively connected to the output ports of each of the first WSSs 21a to 22k and the input ports of each of the second WSSs 23a to 24k.

Then, the input ports of each of the optical couplers 25a to 26d are connected to the output ports of each of the first WSSs 21a to 22k. Further, the wavelength cross-connect device 10B is configured in which the input ports of each of the optical couplers 25a to 26d are connected to the output ports of each of the first WSSs 21a to 22k and the output ports of each of the optical couplers 25a to 26d are connected to the input ports of each of the second WSSs 23a to 24k such that the optical signals input from the optical fibers 1f to Kf in each of the routes 1h to Mh on the input side can be uniformly output to the optical fibers 1f to Kf in each of the routes 1h to Mh on the output side.

According to such a configuration, the wavelength cross-connect device 10B includes, on the input side, the (M×K) first WSSs 21a to 22k having 1×ML ports respectively connected to the optical fibers 1f to Kf in each of the routes 1h to Mh and, on the output side, the (M×K) second WSSs 23a to 24k having ML×1 ports. Further, the wavelength cross-connect device 10B includes the (2×M×L) optical couplers 25a to 26d each having K×K ports respectively connected to the output ports of each of the first WSSs 21a to 22k and the input ports of each of the second WSSs 23a to 24k.

The first WSSs 21a to 22k with the 1×ML ports and the second WSSs 23a to 24k with the ML×1 ports are cheap in terms of unit price, and thus are cheap as a whole compared with the case of using the conventional expensive WSS with multiple ports of both input and output ports. In addition, since the unit price of the optical couplers 25a to 26d with K×K ports are also significantly cheaper than that of the WSSs 21a to 22k, a plurality of optical couplers are used with a low unit price. Therefore, even when a plurality of first WSSs 21a to 22k with 1×ML ports, a plurality of second WSSs 23a to 24k with ML×1 ports, and a plurality of optical couplers 25a to 26d with K×K ports are used, the device costs can be reduced compared with the conventional device.

Configuration Example 1 of WSS

Configuration example 1 of each of the WSSs 21a to 22k on the input side will be described below with reference to FIG. 3. However, the WSS 21a will be described as a representative.

Figure 3:
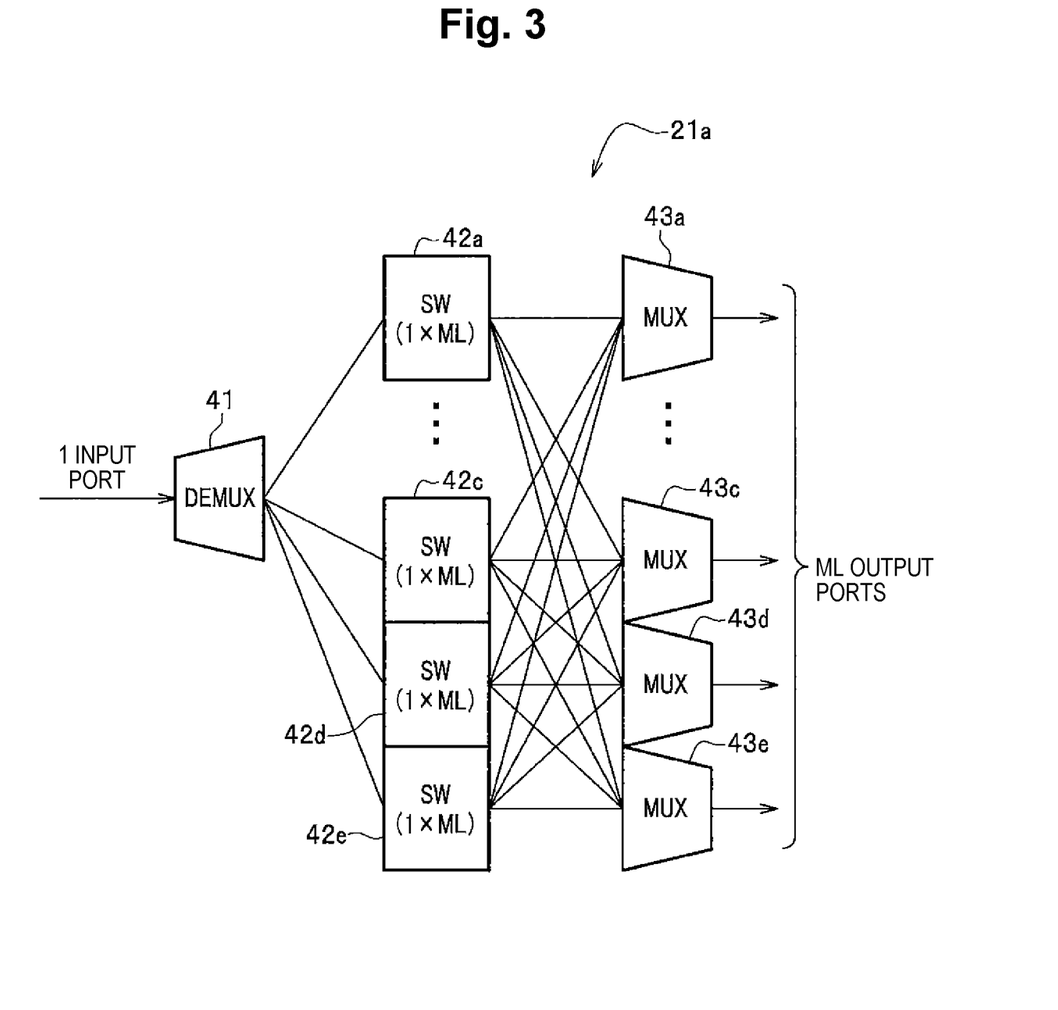
FIG. 3 is a block diagram showing a configuration of an WSS on an input side of a wavelength cross-connect device according to configuration example 1 of the embodiment.

As shown in FIG. 3, the WSS 21a includes a DEMUX (Demultiplexer) 41 configured to demultiplex and output an optical signal subjected to wavelength division multiplexing with a wavelength division multiplexing number T, T SWs (switches) 42a, . . . , 42c, 42d, and 42e with 1×ML ports to which demultiplexed optical signals having respective wavelengths are input, and T MUXs (Multiplexers) 43a, . . . , 43c, 43d, and 43e with ML×1 ports provided corresponding to ML output ports.

The DEMUX 41 demultiplexes an optical signal input from the optical fiber 1f (FIG. 1) in each of the routes 1h to Mh on the input side via 1 input port into optical signals of individual wavelengths. Next, the demultiplexed optical signals are selected by the SWs 42a to 42e, respectively, and are output to the MUXs 43a to 43e, respectively. Then, the MUXs 43a to 43e multiplex the optical signals input from the respective SWs 42a to 42e, and output to the predetermined optical couplers 25a to 26d (FIG. 1) via the ML output ports, respectively.

In the WSS 21a, as described above, the respective SWs 42a to 42e selectively output the optical signals obtained by demultiplexing of the optical signal, which is input from the optical fiber 1f (FIG. 1) in each of the routes 1h to Mh on the input side with the DEMUX 41 and having the individual wavelengths, to the output destination paths (ML output ports), thereby the optical signals having specific wavelengths can be output to the optical couplers 25a to 26d from the predetermined output ports.

Configuration Example 2 of WSS

Configuration example 2 of each of the above-described WSSs 23a to 24k on the output side will be described below with reference to FIG. 4. However, the WSS 23a will be described as a representative.

Figure 4:
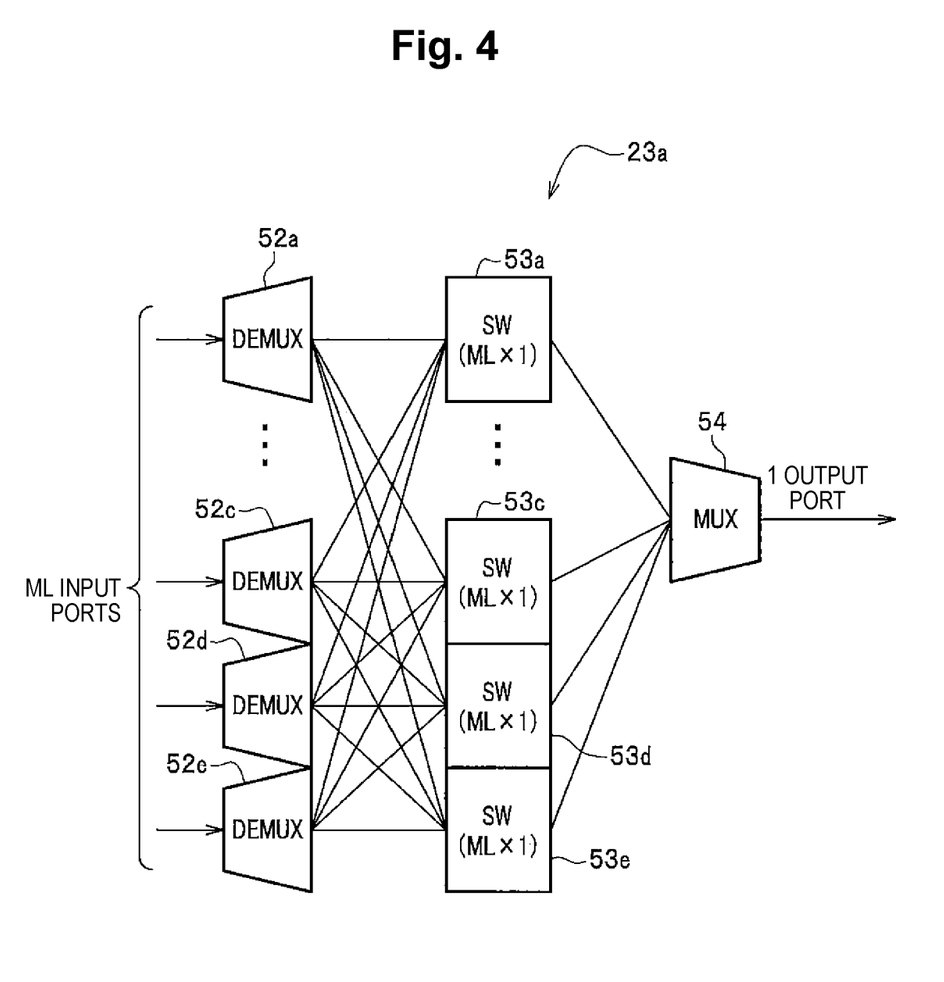
FIG. 4 is a block diagram showing a configuration of an WSS on an output side of a wavelength cross-connect device according to configuration example 2 of the embodiment.

As shown in FIG. 4, the WSS 23a includes DEMUXs 52a, . . . , 52c, 52d, and 52e configured to demultiplex and output optical signals output from 2×M×L optical couplers 25a to 26d (for example, the optical couplers 25a, 25b, 26a, and 26b shown in FIG. 1). Further, the WSS 23a includes SWs 53a, . . . , 53c, 53d, and 53e with ML×1 ports to which the demultiplexed optical signals are input, and a MUX 54 configured to multiplex the optical signals output from the respective SWs 53a to 53e and output the multiplexed optical signal to one optical fiber 1f on the output side from 1 output port.

Each of the DEMUXs 52a to 52e demultiplexes the optical signals input from each of the optical couplers 25a, 25b, 26a, and 26b (FIG. 1), and outputs the demultiplexed optical signals to each of the SWs 53a to 53e. Each of the SWs 53a to 53e selectively outputs each of the input optical signals to the MUX 54. The MUX 54 multiplexes the selectively input optical signals, and outputs the multiplexed optical signal from the 1 output port to the optical fiber 1f (FIG. 1) on the output side.

In the WSS 23a, as described above, the optical signals, which are input from the optical coupler 25a, 25b, 26a, 26b (FIG. 1) are demultiplexed, and the respective SWs 53a to 53e selectively output the respective demultiplexed optical signals to the MUX 54, thereby the optical signal can be output from the 1 output port to the optical fiber 1f (FIG. 1) on the output side.

Configuration Example 3 of WSS

Configuration example 3 of each of the above-described WSSs 21a to 22k on the input side will be described below with reference to FIG. 5. However, the WSSs 21a and 21k will be described as a representative.

Figure 5:
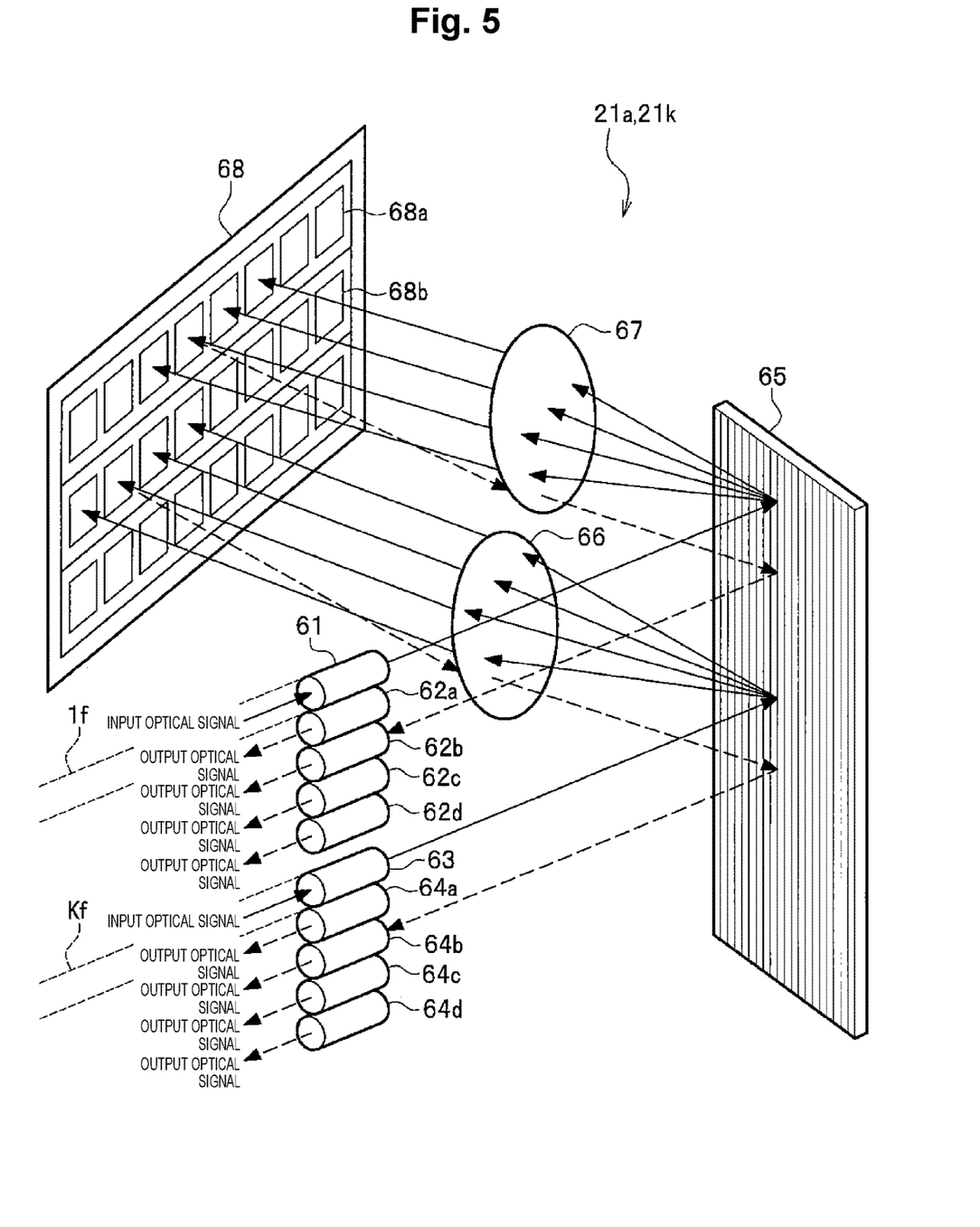
FIG. 5 is a block diagram showing a configuration of an WSS on an input side of a wavelength cross-connect device according to configuration example 3 of the embodiment.

The WSS 21a shown in FIG. 5 includes a fiber collimator (also referred to as a collimator) 61 for input, collimators 62a, 62b, 62c, and 62d for output, which are N times (for example, 4 times) the number of the input collimator 61, a grating (diffraction grating) 65 that demultiplexes the optical signal subjected to wavelength division multiplexing, a lens 67, and an optical switching element 68 made of an LCOS (Liquid Crystal on Silicon), for example. The input collimator 61 is connected to the optical fiber 1f on the input side.

The WSS 21k includes an input collimator 63, collimators 64a, 64b, 64c, and 64d for output, which are N times (for example, 4 times) the number of the input collimator 63, the grating 65, a lens 66, and the optical switching element 68. The grating 65 and the optical switching element 68 are common components in both of the WSSs 21a and 21k. The input collimator 63 is connected to the optical fiber Kf on the input side. The input collimators 61 and 63 form an input collimator disclosed in claims. The output collimators 62a to 62d and 64a to 64d form output collimators disclosed in claims.

The optical switching element 68 includes optical switching elements of WSSs with 1×ML ports in which the N WSSs 21a and 21k with 1×ML ports are integrated, and in this example, includes optical switching elements 68a and 68b in which two WSSs 21a and 21k are integrated respectively.

An operation of the WSSs 21a and 21k having such a configuration will be described. First, in the WSS 21a, an optical signal is incident on the grating 65 from the optical fiber 1f via the collimator 61. The grating 65 performs demultiplexing (for example, 4-demultiplexing) on the optical signal by diffracting and reflecting the optical signal at different angles depending on the wavelength. The 4-demultiplexed optical signals are incident on the optical switching element 68a via the lens 67. The optical switching element 68a changes reflection angles for each wavelength such that the optical signals go toward the output ports of the WSS 21a connected to the input ports of the optical couplers 25a to 25d (FIG. 1), and thus reflects the optical signals. The optical signals reflected by the optical switching element 68a are incident on the output collimators 62a and 62d via the lens 67 and the grating 65 and are output to the input ports of each of the optical couplers 25a to 25d (FIG. 1) from the four output ports of the WSS 21a.

An operation of the other WSS 21k is also performed in the same manner. In other words, an optical signal is incident on the grating 65 from the optical fiber kf via the collimator 63, and is subjected to 4-demultiplexing. The 4-demultiplexed optical signals are incident on the optical switching element 68a via the lens 67. Further, the optical switching element 68a changes reflection angles for each of wavelengths of the optical signals, and thus reflects the optical signals. The reflected optical signals are incident on the output collimators 64a and 64d via the lens 67 and the grating 65 and are output to the input ports of each of the respective optical couplers 25a to 25d.

In such a configuration, the plurality of WSSs 21a to 21k and 22a to 22k respectively connected to the optical fibers 1f to Kf in each of the routes 1h to Mh (FIG. 1) may be configured by a combination of optical system components using the plurality of collimators 61 to 64, the grating 65, the plurality of lenses 66 and 67, and the optical switching element 68. In this way, the plurality of WSSs 21a to 22k can be configured by the combination of the optical system components. For this reason, since the plurality of WSSs 21a to 22k can be integrated, the wavelength cross-connect device 10B can be reduced in size.

Configuration Example 4 of WSS

Configuration example 4 of each of the above-described WSSs 23a to 24k on the output side will be described below with reference to FIG. 6. However, the WSSs 23a and 23k will be described as a representative.

Figure 6:
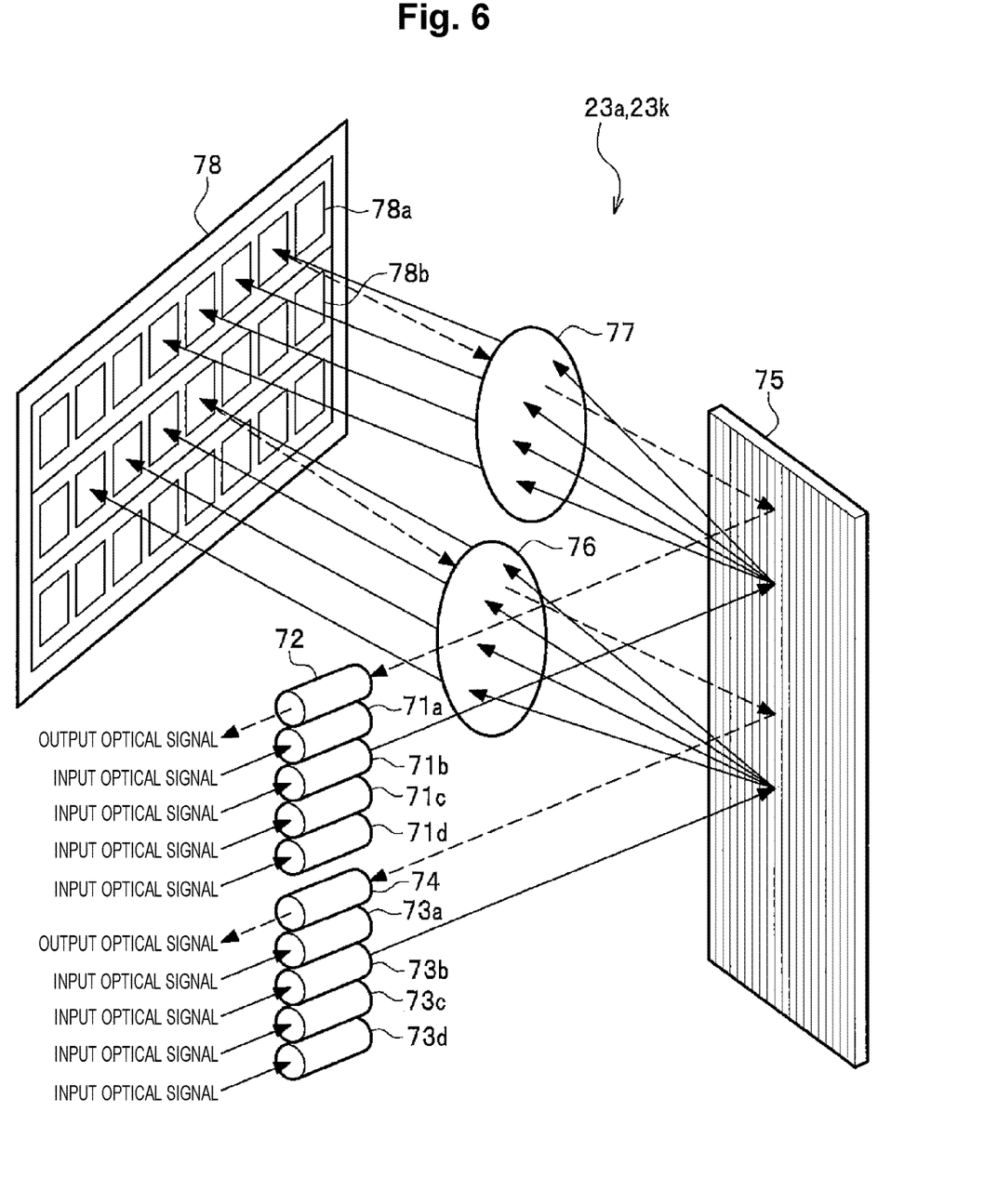
FIG. 6 is a block diagram showing a configuration of an WSS on an output side of a wavelength cross-connect device according to configuration example 4 of the embodiment.

The WSS 23a shown in FIG. 6 includes collimators 71a, 71b, 71c, and 71d for input, an output collimator 72, a grating 75, a lens 77, and an optical switching element 78. The input collimators 71a to 71d are connected to the optical fibers connected to the output ports of the optical couplers 25a, 25b, 26a, and 26b (FIG. 1).

The WSS 23k includes collimators 73a, 73b, 73c, and 73d for input, an output collimator 74, the grating 75, a lens 76, and the optical switching element 78. The input collimators 73a to 73d are connected to the optical fibers connected to the output ports of the optical couplers 25a, 25b, 26a, and 26b (FIG. 1). The input collimators 71a to 71d and 73a to 73d form input collimators disclosed in claims. The output collimators 72 and 74 form output collimators disclosed in claims.

The optical switching element 78 includes optical switching elements of WSSs with 1×ML ports in which the N WSSs 23a and 23k with 1×ML ports are integrated, and in this example, includes optical switching elements 78a and 78b in which two WSSs 23a and 23k with 1×ML ports are integrated respectively.

An operation of the WSSs 23a and 23k having such a configuration will be described. First, in the WSS 23a, optical signals are incident on the grating 75 from the output ports of each of the optical couplers 25a, 25b, 26a, and 26b (FIG. 1) via the collimators 71a to 71d. The grating 75 performs demultiplexing (for example, 4-demultiplexing) on the optical signals by diffracting and reflecting the optical signals at different angles depending on the wavelength. The 4-demultiplexed optical signals are incident on the optical switching element 78a via the lens 77. The optical switching element 78a changes reflection angles for each wavelength such that the optical signals go toward the output ports of the WSS 23a connected to the optical fibers 1f to Kf of the route 1h (FIG. 1), and thus reflects the optical signals. The optical signals reflected by the optical switching element 78a are incident on the output collimator 72 via the lens 77 and the grating 75 and are output to the optical fibers 1f to Kf of the route 1h.

An operation of the other WSS 23k is also performed in the same manner. In other words, optical signal is incident on the grating 75 from the output ports of each of the optical couplers 25a, 25b, 26a, and 26b via the collimators 71a to 71d, and is subjected to 4-demultiplexing. The 4-demultiplexed optical signals are incident on the optical switching element 78b via the lens 76. Further, the optical switching element 78b changes reflection angles for each of wavelengths of the optical signals, and thus reflects the optical signals. The reflected optical signals are incident on the output collimator 74 via the lens 76 and the grating 75 and are output to the optical fibers 1f to Kf of the route 1h.

In such a configuration, the plurality of WSSs 23a to 23k and 24a to 24k respectively connected to the output ports of the optical couplers 25a to 26d (FIG. 1) may be configured by a combination of optical system components using the plurality of collimators 71a to 71d, 72, 73a to 73d, and 74, the grating 75, the plurality of lenses 76 and 77, and the optical switching element 78. In this way, the plurality of WSSs 23a to 24k can be configured by the combination of the optical system components. For this reason, since the plurality of WSSs 23a to 24k can be integrated, the wavelength cross-connect device 10B can be reduced in size.

Specific other configurations can be appropriately changed without departing from the gist of the present invention.

REFERENCE SIGNS LIST 1h to Mh Route
1f to Kf Optical fiber
10B Wavelength cross-connect device
21a to 22k, 23a to 24k WSS
25a to 26d Optical coupler
30 Connection control unit
41, 52a to 52e DEMUX (demultiplexer)
42a to 42e, 53a to 53e SW
43a to 43e, 54 MUX (multiplexer)
61, 63, 71a to 71d, 73a to 73d Fiber collimator for input
62a to 62d, 64a to 64d, 72, 74 Fiber collimator for output
65, 75 Grating
66, 67, 76, 77 Lens
68, 68a, 68b, 78, 78a, 78b Optical switching element

The invention claimed is:

1. A wavelength cross-connect device configured to perform relaying for changing, using WSSs (Wavelength Selective Switches), routes of optical signals transmitted from M routes, in which K optical fibers are grouped for each of the routes, on an input side to output the optical signals to respective optical fibers of M routes on an output side, the wavelength cross-connect device comprising:
M×K first WSSs each including a 1 input port connected to each of the optical fibers of each of the routes on the input side and M×L output ports, wherein L is a positive integer L≤K;
M×K second WSSs each including a 1 output port connected to each of the optical fibers of each of the routes on the output side and M×L input ports; and
2×M×L optical couplers each including K input ports connected to output ports of each of the first WSSs and K output ports connected to input ports of each of the second WSSs, wherein
the input ports of each of the optical couplers are connected to the output ports of respective first WSSs of the first WSSs,
the input ports of each of the optical couplers are connected to the output ports of the first WSSs and the output ports of each of the optical couplers are connected to the input ports of the second WSSs such that the optical signals input from the optical fibers in each of the routes on the input side are capable of being output to the optical fibers in each of the routes on the output side, respectively, and
when the optical signal input from the optical fiber of the route is an optical signal subjected to wavelength division multiplexing with a wavelength division multiplexing number T, each of the first WSSs includes a demultiplexer configured to demultiplex and output an optical signal obtained by wavelength division multiplexing of the optical signal, which is input from the optical fiber of the route, with a wavelength division multiplexing number T, T switches configured to selectively output demultiplexed optical signals having respective wavelengths and including a 1 input port and ML output ports, and T multiplexers configured to multiplex and output the optical signals output from the respective switches and ML input ports and a 1 output port.

2. The wavelength cross-connect device according to claim 1, wherein each of the second WSSs includes 2×M×L demultiplexers configured to demultiplex and output optical signals output from each of the optical couplers, switches including ML input ports, to which the optical signals demultiplexed by each of the demultiplexers are input, and a 1 output port, and a multiplexer configured to multiplex the optical signals output from the switches and output the multiplexed optical signal to the optical fiber on the output side from a 1 output port.

3. The wavelength cross-connect device according to claim 1, wherein when the optical signal input from the optical fiber of the route is an optical signal subjected to wavelength division multiplexing, each of the first WSS includes an input collimator to which the optical signal is input from the optical fiber, a grating configured to diffract and reflect the optical signal incident from the input collimator at different angles depending on a wavelength to perform demultiplexing on the optical signal, an optical switching element that is incident with the demultiplexed optical signals and configured to reflect the optical signals by changing reflection angles for each wavelength of the demultiplexed optical signals such that the demultiplexed optical signals go toward the output ports of each of the first WSSs connected to the input ports of the optical coupler, and output collimators that are incident with the reflected optical signals via the grating and are connected to the input ports of the optical coupler.

4. The wavelength cross-connect device according to claim 1, wherein each of the second WSSs includes input collimators to which the optical signals output from each of the optical couplers are input, a grating configured to diffract and reflect the optical signals incident from the input collimators at different angles depending on a wavelength to perform demultiplexing on the optical signals, an optical switching element that is incident with the demultiplexed optical signals and configured to reflect the optical signals by changing reflection angles for each wavelength of the demultiplexed optical signals such that the demultiplexed optical signals go toward the output ports of each of the second WSSs connected to the optical fiber of the route, and an output collimator that is incident with the reflected optical signals via the grating and are connected to the optical fiber of the route.

5. A cross-connect connection method of a wavelength cross-connect device for performing relaying for changing, using WSSs, routes of optical signals transmitted from M routes, in which K optical fibers are grouped for each of the routes, on an input side to output the optical signals to respective optical fibers of M routes on an output side, the cross-connect connection method comprising steps, which are executed by the wavelength cross-connect device, of:
detecting the number M of the routes on the input side and the number K of the optical fibers in each of the routes;

detecting the number M of the routes on the output side and the number K of the optical fibers in each of the routes;

detecting, based on the detected number K of the optical fibers on the input side, the number of first WSSs each including a 1 input port connected to each of the K optical fibers and M×L output ports, wherein L is a positive integer L K;

detecting, based on the detected number K of the optical fibers on the output side, the number of second WSSs each including a 1 output port connected to each of the K optical fibers and M×L input ports;

connecting the input port of each of the first WSSs to each of the optical fibers in each of the routes on the input side;

connecting the output port of each of the second WSSs to each of the optical fibers in each of the routes on the output side;

detecting the number of optical couplers each including K input ports connected to the output ports of the first WSSs on the input side and K output ports connected to the input ports of the second WSSs on the output side;

connecting the K input ports of each of the optical couplers to the output ports of each of the first WSSs; and connecting the input ports of each of the optical couplers to output ports of the M×K first WSSs on the input side and connecting the output ports of each of the optical couplers to input ports of the second M×K WSSs on the output side such that the optical signals input from the K optical fibers in each of the routes on the input side are capable of being output to the K optical fibers in each of the routes on the output side, respectively, wherein each of the second WSSs includes 2×M×L demultiplexers configured to demultiplex and output optical signals output from each of the optical couplers, switches including ML input ports, to which the optical signals demultiplexed by each of the demultiplexers are input, and a 1 output port, and a multiplexer configured to multiplex the optical signals output from the switches and output the multiplexed optical signal to the optical fiber on the output side from a 1 output port.

6. The cross-connect connection method according to claim 5, wherein when the optical signal input from the optical fiber of the route is an optical signal subjected to wavelength division multiplexing with a wavelength division multiplexing number T, each of the first WSSs includes a demultiplexer configured to demultiplex and output an optical signal obtained by wavelength division multiplexing of the optical signal, which is input from the optical fiber of the route, with a wavelength division multiplexing number T, T switches configured to selectively output demultiplexed optical signals having respective wavelengths and including a 1 input port and ML output ports, and T multiplexers configured to multiplex and output the optical signals output from the respective switches and ML input ports and a 1 output port.

7. The wavelength cross-connect method according to claim 5, wherein when the optical signal input from the optical fiber of the route is an optical signal subjected to wavelength division multiplexing, each of the first WSS includes an input collimator to which the optical signal is input from the optical fiber, a grating configured to diffract and reflect the optical signal incident from the input collimator at different angles depending on a wavelength to perform demultiplexing on the optical signal, an optical switching element that is incident with the demultiplexed optical signals and configured to reflect the optical signals by changing reflection angles for each wavelength of the demultiplexed optical signals such that the demultiplexed optical signals go toward the output ports of each of the first WSSs connected to the input ports of the optical coupler, and output collimators that are incident with the reflected optical signals via the grating and are connected to the input ports of the optical coupler.

8. The wavelength cross-connect method according to claim 5, wherein each of the second WSSs includes input collimators to which the optical signals output from each of the optical couplers are input, a grating configured to diffract and reflect the optical signals incident from the input collimators at different angles depending on a wavelength to perform demultiplexing on the optical signals, an optical switching element that is incident with the demultiplexed optical signals and configured to reflect the optical signals by changing reflection angles for each wavelength of the demultiplexed optical signals such that the demultiplexed optical signals go toward the output ports of each of the second WSSs connected to the optical fiber of the route, and an output collimator that is incident with the reflected optical signals via the grating and are connected to the optical fiber of the route.

* * * * *